US012739904B2

(12) United States Patent
Nadathur et al.

(10) Patent No.: US 12,739,904 B2
(45) Date of Patent: Sep. 15, 2026

(54) TECHNIQUES FOR MANAGING PAIRING PROCEDURES BETWEEN COMPUTING DEVICES AND ACCESSORY COMPUTING DEVICES

(71) Applicant: Apple Inc., Cupertino, CA (US)

(72) Inventors: Anush G. Nadathur, San Jose, CA (US); Justin N. Wood, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 18/652,266

(22) Filed: May 1, 2024

(65) Prior Publication Data

US 2025/0056632 A1 Feb. 13, 2025

Related U.S. Application Data

(60) Provisional application No. 63/519,197, filed on Aug. 11, 2023.

(51) Int. Cl.

| | |
|---|---|
| ***H04W 76/14*** | (2018.01) |
| ***H04W 4/23*** | (2018.01) |

(Continued)

(52) U.S. Cl.

CPC ....... *H04W 76/14* (2018.02); *H04W 52/0216* (2013.01); *H04L 12/2807* (2013.01)

(58) Field of Classification Search

CPC ... H04W 76/14; H04W 52/0216; H04W 4/23; H04W 76/10; H04W 4/80; H04W 76/34;

(Continued)

(56) References Cited

U.S. PATENT DOCUMENTS

| | | | | |
|---|---|---|---|---|
| 9,311,115 | B2 * | 4/2016 | Schubert | G06F 9/452 |
| 9,848,375 | B2 * | 12/2017 | Gould | H04L 12/2809 |

(Continued)

OTHER PUBLICATIONS

International Patent Application No. PCT/US2024/038404; Invitation to Pay Add'l Fees; dated Sep. 24, 2024; 11 pages.

(Continued)

*Primary Examiner* — Andrew Wendell

(74) *Attorney, Agent, or Firm* — BAKERHOSTETLER; Kyle B. Morse

(57) ABSTRACT

A method can be implemented by a computing device that is seeking to pair with an accessory computing device, and includes the steps of (1) obtaining at least an identifier and a setup code associated with the accessory computing device, (2) determining, by scanning a first communications network that is associated with the accessory computing device, that the identifier is not being advertised on the first communications network, (3) generating a hash value based on the identifier and the setup code, (4) identifying, by scanning a second communications network, that the hash value is being advertised on the second communications network, and (5) displaying an affordance that instructs a user to perform (i) a factory reset of the accessory computing device, or (ii) a secondary pairing procedure with the accessory computing device through at least one primary computing device with which the accessory computing device is currently paired.

20 Claims, 10 Drawing Sheets

(51) Int. Cl.
*H04W 52/02* (2009.01)
*H04L 12/28* (2006.01)

(58) Field of Classification Search
CPC .. H04L 12/2807; H04B 3/544; H04B 7/18558
See application file for complete search history.

(56) References Cited

U.S. PATENT DOCUMENTS

| | | | | |
|---|---|---|---|---|
| 12,477,601 | B1 * | 11/2025 | Lam | H04M 1/72409 |
| 2014/0366105 | A1 * | 12/2014 | Bradley | H04W 76/14 726/5 |
| 2015/0121471 | A1 * | 4/2015 | Kunjukrishnan | H04W 12/08 709/225 |
| 2015/0358759 | A1 | 12/2015 | Jakusovszky et al. | |
| 2016/0359629 | A1 * | 12/2016 | Nadathur | H04L 9/14 |
| 2016/0360341 | A1 * | 12/2016 | Srivatsa | H04M 1/72412 |
| 2016/0366541 | A1 * | 12/2016 | Jang | G06F 21/53 |
| 2019/0053161 | A1 * | 2/2019 | Rao | H04W 52/0232 |
| 2020/0106832 | A1 * | 4/2020 | Kim | H04L 12/281 |
| 2020/0358897 | A1 * | 11/2020 | Dellinger | B60K 35/10 |
| 2022/0166700 | A1 | 5/2022 | Abuan et al. | |
| 2023/0254890 | A1 * | 8/2023 | Chou | H04L 5/0023 370/252 |
| 2024/0291727 | A1 * | 8/2024 | Su | A63F 13/92 |

OTHER PUBLICATIONS

International Patent Application No. PCT/US2024/038404; Int'l Search Report and the Written Opinion; dated Dec. 10, 2024; 21 pages.

* cited by examiner

TECHNIQUES FOR MANAGING PAIRING PROCEDURES BETWEEN COMPUTING DEVICES AND ACCESSORY COMPUTING DEVICES

CROSS-REFERENCE TO RELATED APPLICATIONS

The present application claims the benefit of U.S. Provisional Application No. 63/519,197, entitled "TECHNIQUES FOR MANAGING PAIRING PROCEDURES BETWEEN COMPUTING DEVICES AND ACCESSORY COMPUTING DEVICES," filed Aug. 11, 2023, the content of which is incorporated by reference herein in its entirety for all purposes.

FIELD

The described embodiments set forth techniques for managing pairing procedures between computing devices and accessory computing devices.

BACKGROUND

Smart home devices refer to electronic devices that implement home automation functionalities. Smart home devices can include, for example, smart thermostat devices, smart lighting devices, smart lock devices, smart garage devices, smart camera devices, and so on. One key element of smart home systems are smart home hubs, which act as central control systems for various smart home devices that are included in homes. A given smart home hub can be implemented in different forms, such as a standalone device or a built-in component of other devices (e.g., a smart speaker, a home entertainment system, etc.), and is responsible for facilitating communications between the smart home devices and remote computing devices. In most cases, the smart home devices communicate with smart home hubs via wireless protocols (e.g., Wi-Fi, Bluetooth, etc.). Additionally, the smart home hubs typically connect to the home's Wi-Fi network to communicate with the remote computing devices—and, in most cases, gain access to the Internet. Access to the Internet can enable a variety of useful functionalities to be implemented, such as enabling individuals to control the smart home devices outside of the home, enabling activity logs associated with the smart home devices to be managed by one or more external services, and so on.

The number of categories of smart home devices in a given home typically corresponds to the number of smart home software applications ("smart home apps") that are installed on the remote computing devices associated with the smart home. For example, in a smart home that includes (i) a single smart thermostat, (ii) twenty-five smart lighting devices, (iii) two smart lock devices, (iv) one smart garage device, and (v) four smart camera devices, one or more of the remote computing devices likely will include (i) a smart thermostat app, (ii) a smart lighting app, (iii) a smart lock app, (iv) a smart garage door app, and (v) a smart camera app. In this regard, the proliferation of available smart home devices has resulted in heavily fragmented systems that are cumbersome for individuals to manage. For example, an individual who resides in the foregoing example smart home may be required to individually access a majority of the applications during isolated events (e.g., morning routine, bed time routine, etc.) in order to configure the smart home according to the individual's preferences.

Various organizations have, in an effective manner, mitigated the foregoing issues by providing software applications and hardware devices that centralize the control of smart home devices under a unified management interface. In particular, the various smart home hubs of a given home can be configured to interact with a centralized management device—such as a smart home speaker that is capable of communicating with different smart home hubs (and, by extension, the smart home devices that communicate with the smart home hubs)—and the centralized management device can be accessed by a centralized smart home app executing on one or more of the remote computing devices. In this manner, a user of a remote computing device is able to interact with the various smart home devices through the (single) centralized smart home app, rather than numerous smart home apps that are highly specific to the various smart home devices.

Despite the foregoing advancements, a variety of challenges continue to persist within the smart home field, particularly when two or more centralized management devices/centralized smart home apps are utilized by a given user. In one example, a given smart home device is typically configured to, subsequent to performing a first successful pairing with a given controlling entity, update its configuration to cease broadcasting its identifier (that it otherwise broadcasts after an initial power-on and throughout an initial setup mode). Consequently, when a new (i.e., supplemental) controlling entity seeks to pair with the smart home device—e.g., in conjunction with a scan of a quick-response (QR) that includes an identifier/setup code associated with the smart home device—the new controlling entity is left searching for an advertisement of an identifier (that, based on the aforementioned configurational update, is no longer being advertised by the smart home device). Such a scenario can be confusing to the user as they are left uncertain about both the nature of the connectivity issues that are taking place and any remedial actions that are available. Moreover, even when remedial actions are available to the user, they are still faced with the cumbersome responsibility of performing such remedial actions each time they acquire a new smart home device and seek to pair it with multiple controlling entities.

Accordingly, what is needed is an effective approach for enabling individuals to configure their smart home devices in a seamless, intuitive, and efficient manner.

SUMMARY

The described embodiments set forth techniques for managing pairing procedures between computing devices and accessory computing devices.

One embodiment sets forth a method for guiding pairing procedures between computing devices and accessory computing devices. According to some embodiments, the method can be implemented by a computing device that is seeking to pair with an accessory computing device, and includes the steps of (1) obtaining at least an identifier and a setup code associated with the accessory computing device, (2) determining, by scanning a first communications network that is associated with the accessory computing device, that the identifier is not being advertised on the first communications network, (3) generating a hash value based on the identifier and the setup code, (4) identifying, by scanning a second communications network, that the hash value is being advertised on the second communications network, and (5) displaying an affordance that instructs a user to perform (i) a factory reset of the accessory computing device, or (ii) a secondary pairing procedure with the accessory computing device through at least one primary computing device with which the accessory computing device is currently paired.

Another embodiment sets forth a method for synchronizing pairing procedures between computing devices and accessory computing devices. According to some embodiments, the method can be implemented by a first computing device, and includes the steps of (1) receiving, from a second computing device, a request for the second computing device to pair with a first accessory computing device with which the first computing device is paired, (2) facilitating a pairing between the first accessory computing device and the second computing device, (3) registering the second computing device to be notified when other accessory computing devices are paired with the first computing device, (4) pairing with a second accessory computing device, and (5) providing, to the second computing device, a notification of the pairing between the first computing device and the second accessory computing device.

Yet another embodiment sets forth a method for pairing accessory computing devices with other computing devices. According to some embodiments, the method can be implemented by an accessory computing device that is paired with a first computing device, and includes the steps of (1) receiving, from the first computing device, a request for the accessory computing device to pair with a second computing device, (2) updating a configuration of the accessory computing device to: cause the accessory computing device to enter into a pairing mode, cause the accessory computing device to remain in the pairing mode until a time that exceeds a next-scheduled awake cycle of the accessory computing device by a threshold amount of time, and cause the accessory computing device to, in conjunction with entering into the next-scheduled awake cycle, advertise to at least the second computing device that the accessory computing device is able to perform a pairing, (3) receiving a pairing request from the second computing device, and (4) pairing with the second computing device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for managing pairing procedures between computing devices and accessory computing devices.

Figure 1:
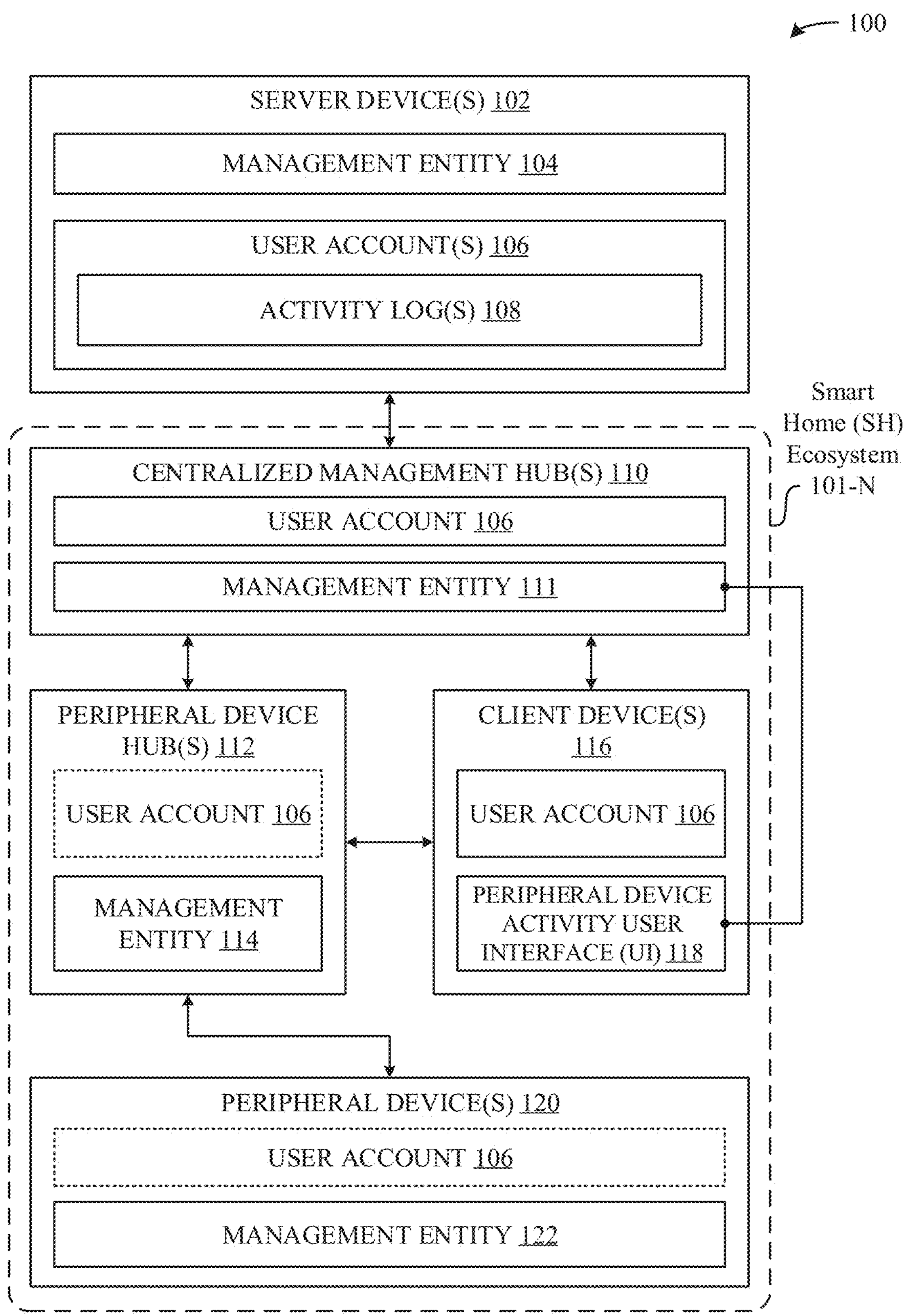
FIG. 1 illustrates a block diagram of different components of a system that can be configured to implement the various techniques described herein, according to some embodiments.

FIG. 1 illustrates a block diagram of different components of a system 100 that can be configured to implement the various techniques described herein, according to some embodiments. As shown in FIG. 1, the system 100 can include one or more server computing devices 102. The system 100 can also include one or more smart home ecosystems 101, which each logically encapsulate a subset of various smart home devices that are included in a given home, structure, and so on. As shown in FIG. 1, a given smart home ecosystem 101 can include one or more centralized management hubs 110, one or more peripheral device hubs 112, one or more client devices 116, and one or more peripheral devices 120.

According to some embodiments, one or more of the server computing devices 102 can represent an entity, e.g., an organization, a service, etc., that provides various functionalities, such as cloud-based services over the Internet. According to some embodiments, a given server computing device 102 can include a management entity 104 that is configured to interface with the centralized management hubs 110, the peripheral device hubs 112, the client devices 116, and/or the peripheral devices 120. For example, the management entity 104 can be configured to process activity log requests (e.g., delete, write, overwrite, read, etc.) issued by the centralized management hubs 110, the peripheral device hubs 112, the client devices 116, and/or the peripheral devices 120, facilitate commands issued between the aforementioned devices, and so on. As shown in FIG. 1, the management entity 104 can associate any number of activity logs 108 with any number of user accounts 106 that are linked to the centralized management hubs 110, the peripheral device hubs 112, the client devices 116, and/or the peripheral devices 120, in order to effectively process activity log requests issued by such devices.

As a brief aside, it is noted that each client device 116 can have any number of software applications (smart home apps or otherwise) installed thereon and can implement a software application manager that is configured to facilitate installations, executions (e.g., loading, displaying, etc.), and so on, of the software applications. Each client device 116 can also be associated with a user account 106. Such an association can be established, for example, when a user of the client device 116 provides the requisite information to create, log into, etc., a user account 106 using the client device 116. According to some embodiments, a user account 106 for a user can include username/password information, contact information associated with the user, demographic information associated with the user, and so on. It is noted that the foregoing examples are not meant to be limiting, and that the user accounts 106 can store any user-related (or other) information, at any level of granularity, without departing from the scope of this disclosure.

According to some embodiments, a given peripheral device 120 executing a management entity 122 can represent a device that is capable of performing different functionalities. For example, the peripheral device 120 can represent any smart home device, e.g., a smart speaker, a smart thermostat, a smart lock, a smart camera, a smart light bulb/light switch, a smart plug, a smart smoke detector, a smart doorbell, a smart garage door opener, a smart irrigation system, a smart appliance, a smart window blind, a smart air purifier, a smart vacuum cleaner, and the like. As described herein, a given peripheral device 120 can be configured to interface with one or more peripheral device hubs 112. For example, a group of peripheral devices 120 that represent smart light switches can be configured to communicate with a peripheral device hub 112 using standardized, proprietary, etc., wireless communications. In another example, a group of peripheral devices that represent smart window blinds can be configured to communicate with a peripheral device hub 112 using wired communications.

In the foregoing examples, one or more of the client devices 116 typically include individual software applications ("smart home apps") that correspond to respective ones of the peripheral device hubs 112 and enable the peripheral devices 120 to be controlled via the peripheral device hubs 112. In particular, the smart home apps can be configured to interface with management entities 114 executing on the peripheral device hubs 112 in order to access the available functionalities of the peripheral devices 120 controlled by the peripheral device hubs 112. It is noted, however, that some peripheral devices 120 can be configured to operate without the need for peripheral device hubs 112. For example, a peripheral device 120 that represents a smart garage door opener can be configured to interface directly with one or more of the client devices 116, the centralized management hub 110, and so on, without the involvement of a peripheral device hub 112. In this example, one or more of the client devices 116 can include a smart home app that enables the client devices 116 to communicate directly with the smart garage door opener (e.g., over a connection formed using Wi-Fi, Bluetooth, the Internet, etc.). In another example, the smart garage door opener can be configured to interface with the centralized management hub 110 independent from any other devices.

As described herein, the implementation of various peripheral device hubs 112/peripheral devices 120 can result in a fragmented system that can be cumbersome for individuals to manage. In particular, an individual may be required to individually access different smart home apps each time they would like to interact with the peripheral devices 120. Accordingly, a centralized management hub 110 that includes a management entity 111 can be employed to centralize the functionalities of the peripheral device hubs 112/peripheral devices 120 under a common interface, which is referred to herein as a smart home ecosystem 101. In this regard, a given centralized management hub 110 can represent a centralized management device that is capable of communicating with any number of peripheral device hubs 112, peripheral devices 120, and/or client devices 116. In one example, the centralized management hub 110 can represent a standalone device that is solely designed to centralize the control of different peripheral devices 120, e.g., in conjunction with a peripheral device activity user interface (UI) 118 implemented on the client devices 116 (the details of which are described below in greater detail). In another example, the centralized management hub 110 can represent a device that provides additional functionalities to those described above, such as smart home device functionalities. For example, the centralized management hub 110 can provide smart speaker functionalities, streaming device functionalities, and the like, in addition to the centralization functionalities described herein.

It is noted that the foregoing examples are not meant to be limiting, and that the centralized management hub 110 can be configured to provide any number of functionalities (in addition to the centralization functionalities described herein) without departing from the scope of this disclosure. Additionally, it is noted that the embodiments do not rely on one or more of the centralized management hubs 110 to provide the functionalities described herein. In particular, the functionalities of the centralized management hub 110 can be implemented, in whole or in part, by one or more of the peripheral device hubs 112, the peripheral devices 120, the client devices 116, and/or other device(s) not illustrated in FIG. 1. For example, one or more of the peripheral device hubs 112, the client devices 116, and/or the peripheral devices 120 can be configured to interface directly/indirectly with one another, as well as the server computing devices 102, without departing from the scope of this disclosure.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 6. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2A-2C, 3A-3C, 4A-4B, and 5.

Figure 2A:
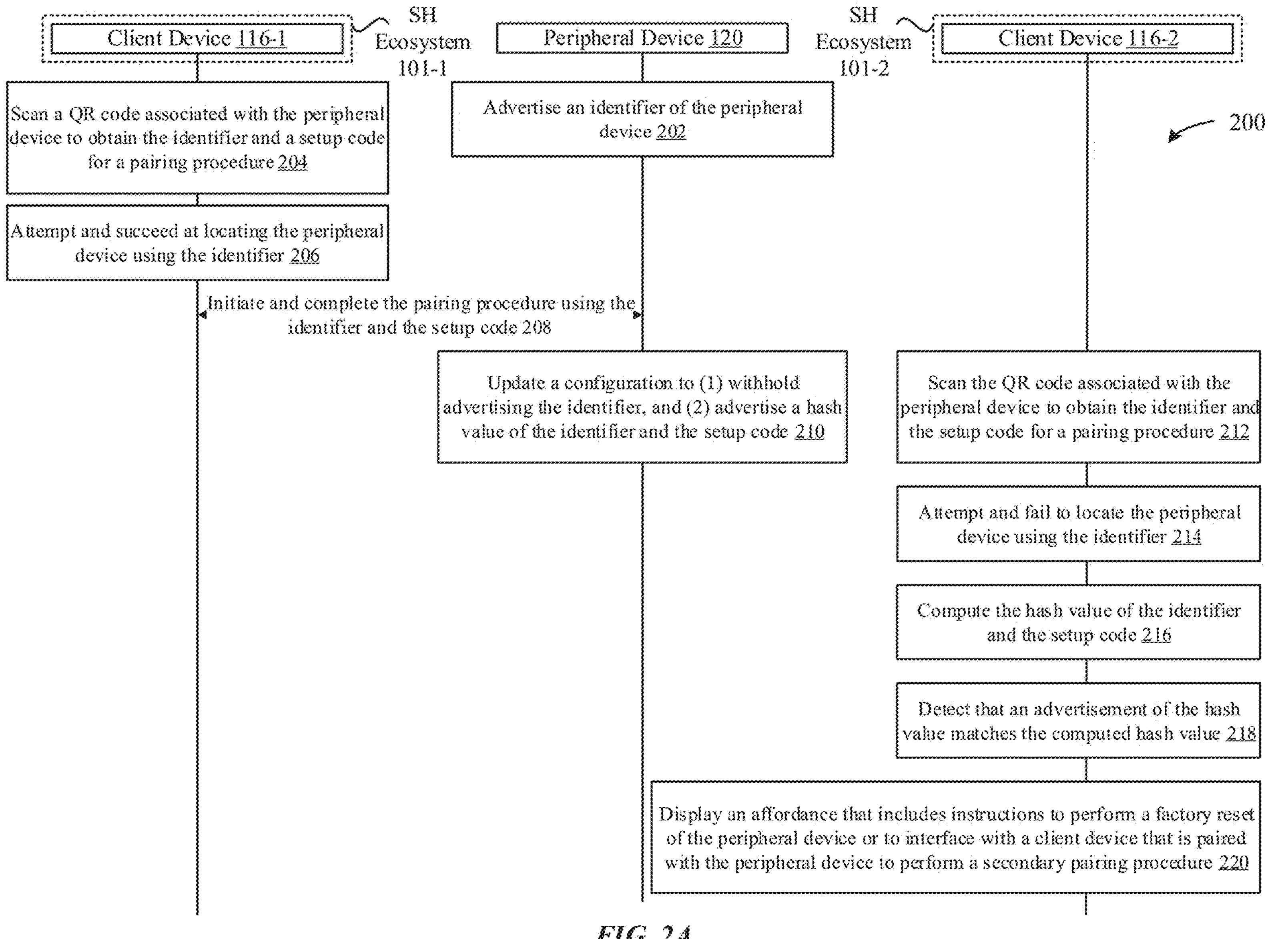
FIG. 2A illustrates a sequence diagram for guiding pairing procedures between computing devices and accessory computing devices, according to some embodiments.

FIG. 2A illustrates a sequence diagram 200 for guiding pairing procedures between computing devices and accessory computing devices, according to some embodiments. As shown in FIG. 2A, the sequence diagram 200 begins at step 202, where a peripheral device 120 advertises an identifier of the peripheral device 120. The identifier can represent, for example, a "discriminator" under the Matter standard. According to some embodiments, at step 202, the peripheral device 120 is operating in an unpaired state, such as when the peripheral device 120 is powered on for a first time, when the peripheral device 120 completes a factory reset, when the peripheral device 120 unpairs from all computing devices, and so on. According to some embodiments, the peripheral device 120 can broadcast its identifier using one or more communications protocols, such as Near-Field Communication (NFC), Bluetooth®, Wi-Fi, and so on. According to some embodiments, the peripheral device 120 can be configured to advertise the identifier until the peripheral device 120 is paired with at least one controlling entity, such as a smart home ecosystem 101.

At step 204, a smart home ecosystem 101-1, by way of a client device 116 that is communicatively coupled to the smart home ecosystem 101-1, scans a QR code associated with the peripheral device 120 to obtain the identifier and a setup code to perform a pairing procedure with the peripheral device 120. According to some embodiments, the QR code can be printed on the peripheral device 120 itself, printed on materials associated with the peripheral device 120 (e.g., a user manual, packaging, etc.), and so on. According to some embodiments, the identifier, the setup code, and/or other information contained within the QR code (or looked-up based on any information included in the QR code) can provide guidance about how to communicate with the peripheral device 120 over a particular communications protocol. For example, when the peripheral device 120 advertises its identifier using Bluetooth® protocols, the guidance can instruct the client device 116-1 (operating under the smart home ecosystem 101-1) to activate its Bluetooth® radio to search for the identifier. It is noted that the embodiments are not limited to QR code based approaches, and that any approach—such as manual entry, alternative code scanning, wireless transmissions, etc.—can be utilized to obtain the identifier and the setup code without departing from the scope of this disclosure. In any case, at step 206, the client device 116-1 (operating under the smart home ecosystem 101-1) attempts and succeeds at locating the peripheral device 120 using the identifier.

At step 208, the client device 116-1 (operating under the smart home ecosystem 101-1) and the peripheral device 120 initiate and complete the pairing procedure using the identifier and the setup code. According to some embodiments, the pairing procedure can involve forming a secure connection using the setup code, and then performing, via the secure connection, any number of steps to complete the pairing procedure. The steps can include, for example, exchanging cryptographic credentials, updating (local, cloud-based, etc.) configurations, and so on. It is noted that a detailed explanation of pairing procedures is being omitted in the interest of simplifying this disclosure, and that any approach for effectively pairing devices can be utilized without departing from the scope of this disclosure. In any case, at the conclusion of step 208, the peripheral device 120 qualifies as a paired device, which is referred to as a "commissioned" device under the Matter standard.

At step 210, the peripheral device 120—as a result of successfully pairing with at least one controlling entity (at step 208)—updates its configuration to withhold (i.e., cease) advertising the identifier (that is otherwise advertised by the peripheral device 120 when operating in an unpaired state). According to some embodiments, the peripheral device 120 withholds advertising the identifier given the peripheral device 120 qualifies as a paired device, and, at least for the time being, likely will not be provoked to pair with other controlling entities. However, when a situation arises where it is desirable to pair the peripheral device 120 with a supplemental controlling entity—such as an alternative smart home ecosystem 101—scanning the QR code will result in the supplemental controlling entity attempting to search for the identifier (extracted from the QR code). Given the identifier is no longer being advertised by the peripheral device 120, a time-out of the search will occur, which can lead to confusion and a poor overall user experience.

Accordingly, at step 210, the peripheral device 120 also updates its configuration to advertise a hash value of the identifier and the setup code. According to some embodiments, the identifier and the setup code can be pre-processed in any way (e.g., modified, concatenated, etc.), and can then be provided to any form of a hash function to produce the hash value. According to some embodiments, the hash value can then be advertised using any communications protocol. For example, in one embodiment, the peripheral device 120 can be configured to advertise the hash value by adding a new key value to its domain name service-service discovery (DNS-SD) record (e.g., over the network to which the peripheral device 120 gained access (e.g., Wi-Fi)). In this manner, a supplemental controlling entity can, in response to experiencing a time-out when searching for an advertisement of the identifier, calculate a hash value based on the identifier and the setup code (using the same hash function/approaches discussed above), and then search for the hash value (e.g., over any number of communications protocols). If the hash value is identified, then the supplemental controlling entity can effectively determine that the peripheral device 120 is a paired device. In turn, alternative pairing procedures—which are described below in conjunction with FIGS. 3A-3B and 4A-4B—can be utilized to enable the supplemental controlling entity to pair with the peripheral device 120. A breakdown of the foregoing techniques is described below in conjunction with steps 212-220.

At step 212, a smart home ecosystem 101-2—i.e., a supplemental controlling entity—by way of a client device 116 that is communicatively coupled to the smart home ecosystem 101-2, scans the QR code associated with the peripheral device 120 to obtain the identifier and the setup code for performing a pairing procedure (or obtains the identifier and the setup code using the alternative approaches discussed herein). It is noted that the client device 116-1 operating under the smart home ecosystem 101-1 and the client device 116-2 operating under the smart home ecosystem 101-2 can be one and the same, or distinct client devices 116, without departing from the scope of this disclosure.

At step 214, the client device 116-2 (operating under the smart home ecosystem 101-2) attempts and fails to locate the peripheral device using the identifier (e.g., as described above in conjunction with step 210). At step 216, the client device 116-2 (operating under the smart home eccosystem 101-2) computes the hash value of the identifier and the setup code (e.g., as described above in conjunction with step 210). At step 218, the client device 116-2 (operating under the smart home ecosystem 101-2) detects that an advertisement of the hash value matches the computed hash value—which, as described above in conjunction with step 210, effectively informs the client device 116-2 that the peripheral device 120 is already paired with another controlling entity.

At step 220, the client device 116-2 (operating under the smart home ecosystem 101-2) displays an affordance (e.g., a human-perceptible user interface) that includes instructions to perform a factory reset of the peripheral device. The instructions can be retrieved, for example, by performing a lookup of the identifier against a database of factory reset instructions for peripheral devices 120. The factory reset instructions are provided so that the peripheral device 120 can be restored to an initial (i.e., unpaired) state. In turn, the client device 116-2 can reattempt to pair with the peripheral device 120 by scanning the QR code, and presumably pair with the peripheral device 120 using out-of-the box procedures.

Additionally, the affordance can include instructions to interface with a client device that is paired with the peripheral device to perform a secondary pairing procedure. In particular, and as described in greater detail herein, the smart home ecosystem 101-1/client device 116-1, in view of their paired status with the peripheral device 120, can interface with the peripheral device 120 and the smart home ecosystem 101-2/client device 116-2 to enable a secondary pairing procedure to take place between the peripheral device 120 and the smart home ecosystem 101-2/client device 116-2. In this regard, the affordance can encourage a user of the client device 116-2 to seek out the client device 116-1, another client device 116-1 that operates under the smart home ecosystem 101-2, users thereof, etc., to engage in the aforementioned secondary pairing procedure. It is noted that the foregoing examples are not meant to be limiting, and that any form, type, etc., of information can be included in the affordance, at any level of granularity, without departing from the scope of this disclosure.

Figure 2B:
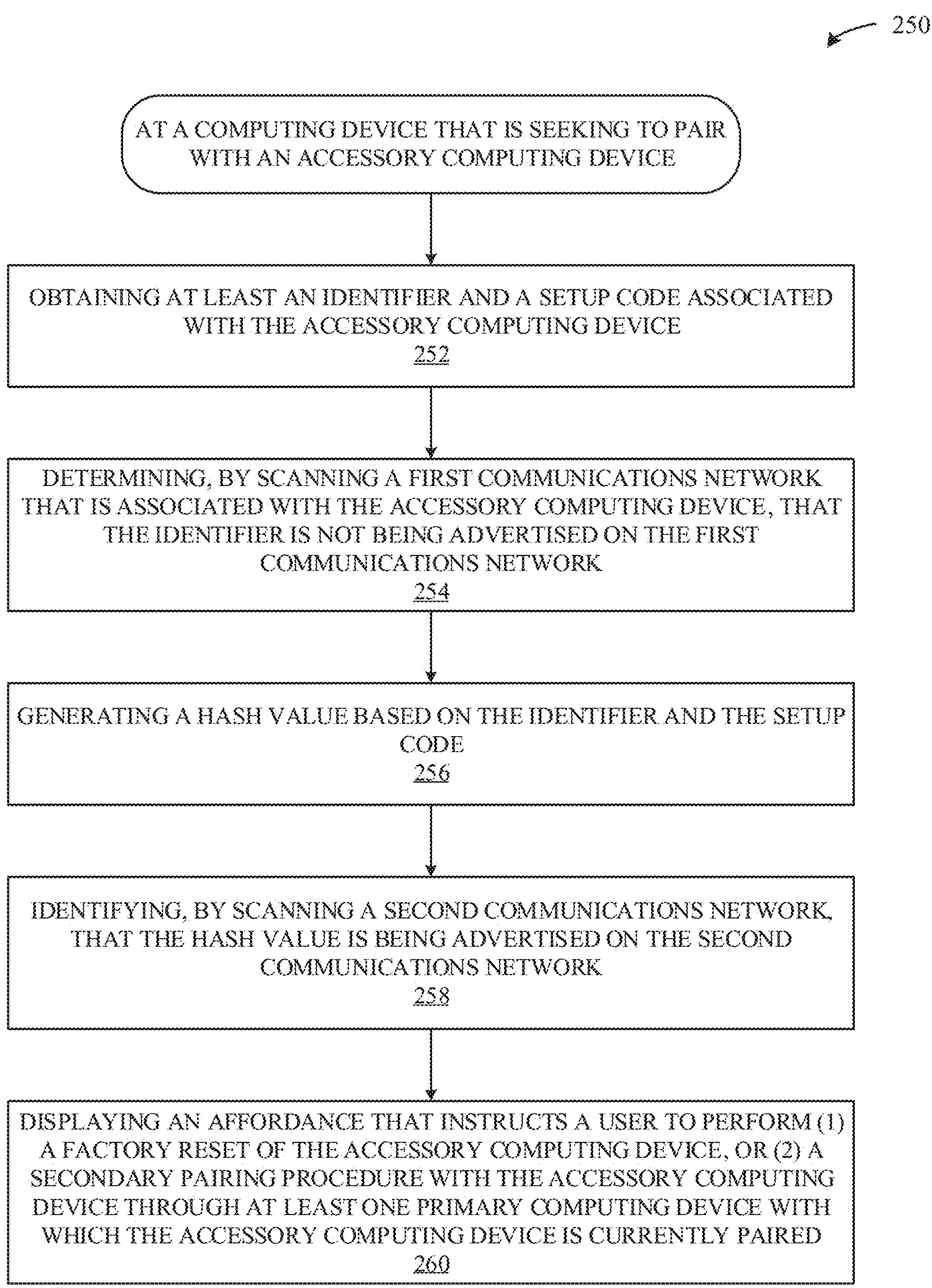
FIG. 2B illustrates a method for guiding pairing procedures between computing devices and accessory computing devices, according to some embodiments.

FIG. 2B illustrates a method 250 for guiding pairing procedures between computing devices and accessory computing devices, according to some embodiments. According to some embodiments, the method 250 can be implemented by a computing device (e.g., a client device 116 on behalf of a smart home ecosystem 101) that is seeking to pair with an accessory computing device (e.g., a peripheral device 120). As shown in FIG. 2B, the method 250 begins at step 252, where the computing device obtains at least an identifier and a setup code associated with the accessory computing device (e.g., as described above in conjunction with step 212 of FIG. 2A).

At step 254, the computing device determines, by scanning a first communications network that is associated with the accessory computing device, that the identifier is not being advertised on the first communications network (e.g., as described above in conjunction with step 214 of FIG. 2A). At step 256, the computing device generates a hash value based on the identifier and the setup code (e.g., as described above in conjunction with step 216 of FIG. 2A). At step 258, the computing device identifies, by scanning a second communications network, that the hash value is being advertised on the second communications network (e.g., as described above in conjunction with step 218 of FIG. 2A). At step 260, the computing device displays an affordance that instructs a user to perform (1) a factory reset of the accessory computing device, or (2) a secondary pairing procedure with the accessory computing device through at least one primary computing device with which the accessory computing device is currently paired (e.g., as described above in conjunction with step 220 of FIG. 2A).

Figure 2C:
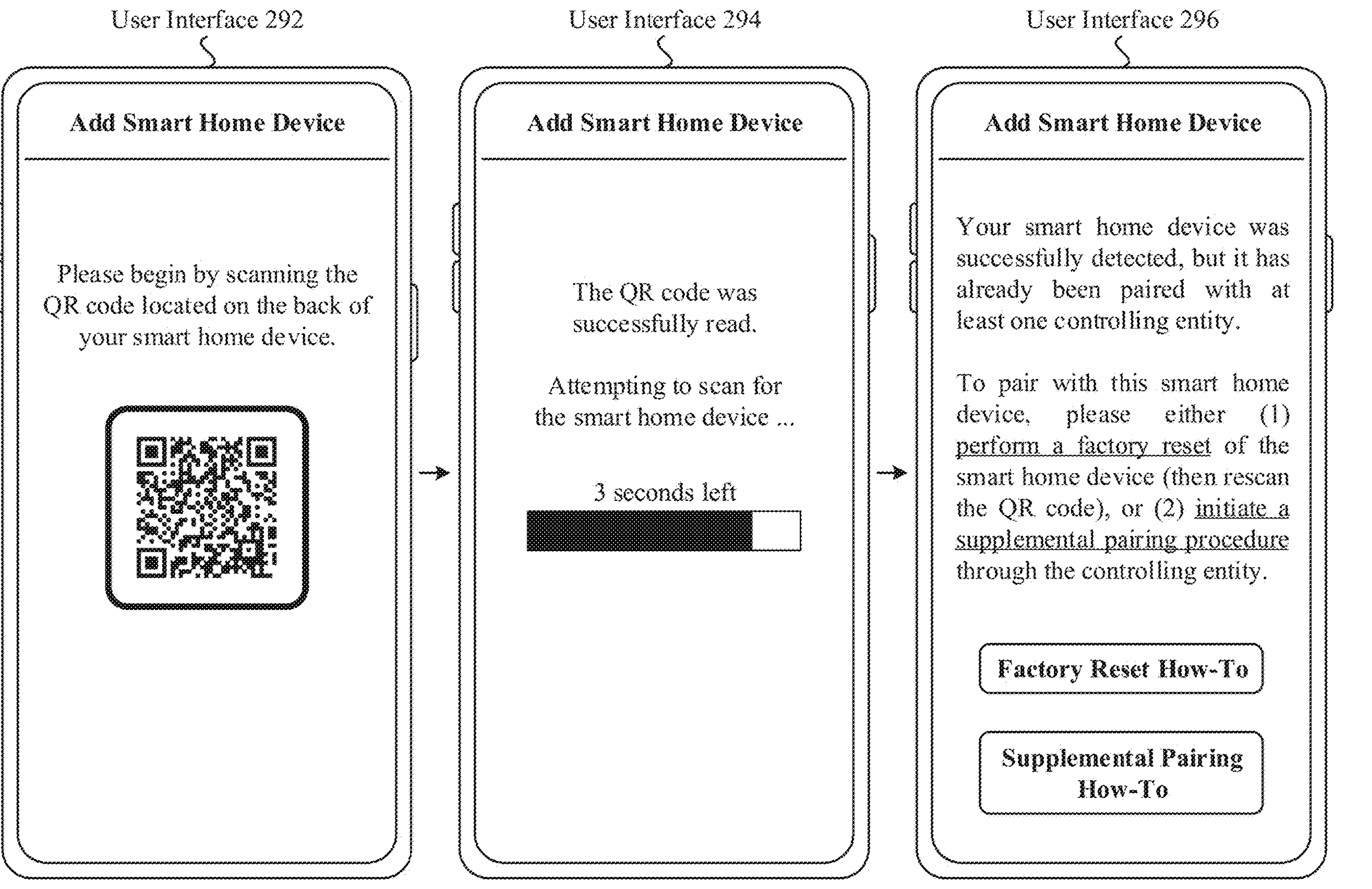
FIG. 2C illustrates a conceptual diagram of example user interfaces that can be implemented in conjunction with the techniques for guiding pairing procedures between computing devices and accessory computing devices described in conjunction with FIGS. 2A-2B.

FIG. 2C illustrates a conceptual diagram 290 of example user interfaces that can be implemented in conjunction with the techniques for guiding pairing procedures between computing devices and accessory computing devices described above in conjunction with FIGS. 2A-2B. As shown in FIG. 2C, an example user interface 292 can be displayed in conjunction with a user (e.g., operating a client device 116) attempting to add a smart home device to a controlling entity (e.g., a smart home ecosystem 101) by scanning a QR code associated with the smart home device. In this example, the smart home device has already been paired with another controlling entity (i.e., another smart home ecosystem 101). Consequently, the client device 116 fails to locate the smart home device using out-of-the-box pairing procedures. This aspect is represented by the example user interface 294. In turn, an example user interface 296 can be displayed in conjunction with the client device 116 locating the smart home device using the hash function/value approaches discussed herein. In this regard, and as shown in FIG. 2C, the example user interface 296 can include information that informs the user of different approaches that can be taken to ultimately enable a pairing with the smart home device. It is noted that the example user interfaces in FIG. 2C are merely exemplary, and can be modified in any fashion that implements, incorporates, reflects, etc., the various techniques described herein, at any level of granularity, without departing from the scope of this disclosure.

Figure 3A:
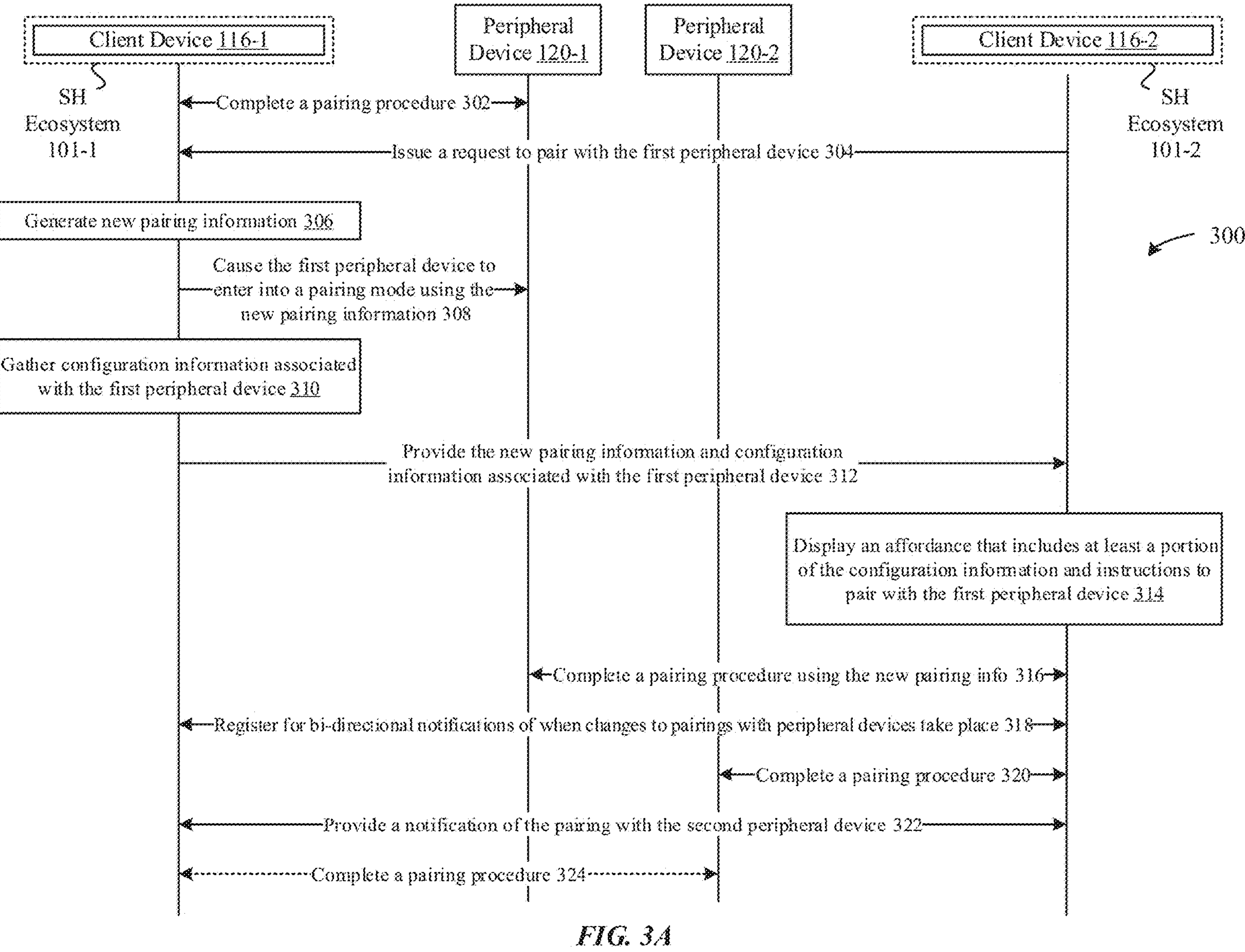
FIG. 3A illustrates a sequence diagram of a method for synchronizing pairing procedures between computing devices and accessory computing devices, according to some embodiments.

FIG. 3A illustrates a sequence diagram 300 of a method for synchronizing pairing procedures between computing devices and accessory computing devices, according to some embodiments. As shown in FIG. 3A, the sequence diagram 300 begins at step 302, where a smart home ecosystem 101-1 (i.e., a controlling entity), by way of a client device 116-1 that is communicatively coupled to the smart home ecosystem 101-1, completes a pairing procedure with a peripheral device 120-1. Here, the pairing procedure can represent an initial pairing procedure, such that the peripheral device 120-1 transitions from operating as an unpaired device to a device that is paired with the smart home ecosystem 101-1 (e.g., as described above in conjunction with steps 202-210 of FIG. 2A).

At step 304, a smart home ecosystem 101-2—i.e., a supplemental controlling entity—by way of a client device 116-2 that is communicatively coupled to the smart home ecosystem 101-2, issues a request to pair with the peripheral device 120-1. According to some embodiments, the smart home ecosystem 101-1/client device 116-1 can implement an Application Programming Interface (API) that enables such pairing requests to be issued and received (e.g., from supplemental controlling entities/other client devices 116, from users operating client devices 116 that are communicatively coupled to the smart home ecosystem 101-1, and so on). It is noted that the client device 116-1 operating under the smart home ecosystem 101-1 and the client device 116-2 operating under the smart home ecosystem 101-2 can be one and the same, or distinct client devices 116, without departing from the scope of this disclosure.

At step 306, the client device 116-1 (operating under the smart home ecosystem 101-1) generates new pairing information. The new pairing information can include, for example, a new identifier (e.g., a new "discriminator" under the Matter standard), a new setup code, and so on. In turn, at step 308, the client device 116-1 (operating under the smart home ecosystem 101-1) causes the peripheral device 120-1 to enter into a pairing mode using the new pairing information. At step 310, the client device 116-1 (operating under the smart home ecosystem 101-1) gathers configuration information associated with the peripheral device 120-1. The configuration information can include, for example, characteristic information associated with the peripheral device 120-1, such as a name associated with the peripheral device 120-1, a room associated with the peripheral device 120-1, a zone associated with the peripheral device 120-1, a sleep interval associated with the peripheral device 120-1, and so on. It is noted that the foregoing examples are not meant to be limiting, and that any type, form, etc., of information associated with the peripheral device 120-1, at any level of granularity, can be gathered without departing from the scope of this disclosure. At step 312, the client device 116 (operating under the smart home ecosystem 101-1) provides, to the client device 116-2 (operating under the smart home ecosystem 101-2), the new pairing information and the configuration information associated with the peripheral device 120-1.

At step 314, the client device 116-2 (operating under the smart home ecosystem 101-2) displays an affordance that includes at least a portion of the configuration information and instructions to pair with the peripheral device 120-1. For example, the affordance can take the form of a user interface that includes the name, room, and zone associated with the peripheral device 120-1 so that a user of the client device 116-2 is confident that the appropriate peripheral device has been selected for pairing. The user interface can also include instructions to pair with the peripheral device 120-1—such as guidance on how to interact with the peripheral device 120-1 during the pairing procedure (e.g., pressing physical buttons on the peripheral device 120-1, standing near the peripheral device 120-1, etc.), what to expect/look out for during the pairing procedure, and so on. It is noted that the foregoing examples are not meant to be limiting, and that any type, form, etc., of information can be included in the affordance, at any level of granularity, without departing from the scope of this disclosure.

At step 316, the client device 116-2 (operating under the smart home ecosystem 101-2) completes a pairing procedure with the peripheral device 120-1 using the new pairing information. According to some embodiments, the pairing procedure can be completed using the same approach(es) described herein, except that the new pairing information (rather than the factory-provided pairing information) is utilized during the pairing procedure. For example, the pairing procedure can involve forming a secure connection using the new setup code (included in the new pairing information), and then performing, via the secure connection, any number of steps to complete the pairing procedure. The steps can include, for example, exchanging cryptographic credentials, updating (local, cloud-based, etc.) configurations, and so on. Again, it is noted that a detailed explanation of pairing procedures is being omitted in the interest of simplifying this disclosure, and that any approach for effectively pairing devices can be utilized without departing from the scope of this disclosure.

At step 318, the client device 116-1 (operating under the smart home ecosystem 101-1) and the client device 116-2 (operating under the smart home ecosystem 101-2) register for bi-directional notifications of when changes to their respectively-managed peripheral devices 120 take place. According to some embodiments, the registrations can take place using the API described above in conjunction with step 304. For example, the client device 116-1 can issue a request (e.g., on behalf of the smart home ecosystem 101-1) to the client device 116-2 (operating under the smart home ecosystem 101-2) to receive updates any time changes (e.g., additions, removals, updates, etc.) to pairings between the smart home ecosystem 101-2 and peripheral devices take place. Alternatively, or additionally, the client device 116-2 can issue a request (e.g., on behalf of the smart home ecosystem 101-2) to the client device 116-1 (operating under the smart home ecosystem 101-1) to receive updates any time changes to pairings between the smart home ecosystem 101-1 and peripheral devices take place. It is noted that the foregoing examples are not meant to be limiting, and that any number of controlling entities can register to receive requests from one another about any type, form, etc., of changes to their configurations, at any at any level of granularity, without departing from the scope of this disclosure.

At step 320, the client device 116-2 (operating under the smart home ecosystem 101-2) completes a pairing procedure with a peripheral device 120-2 (i.e., a new peripheral device 120). Here, due to the notification registration that occurred at step 318, the client device 116-2/smart home ecosystem 101-2 is obligated to inform the smart home ecosystem 101-1/client device 116-1 of the new pairing. Accordingly, at step 322, the client device 116-2 (operating under the smart home ecosystem 101-2) provides a notification of the pairing with the peripheral device 120-2. In turn, at optional step 324, the client device 116-1 (operating under the smart home ecosystem 101-1) can complete a pairing procedure with the peripheral device 120-2 (e.g., using steps similar to steps 304-316 discussed above).

Figure 3B:
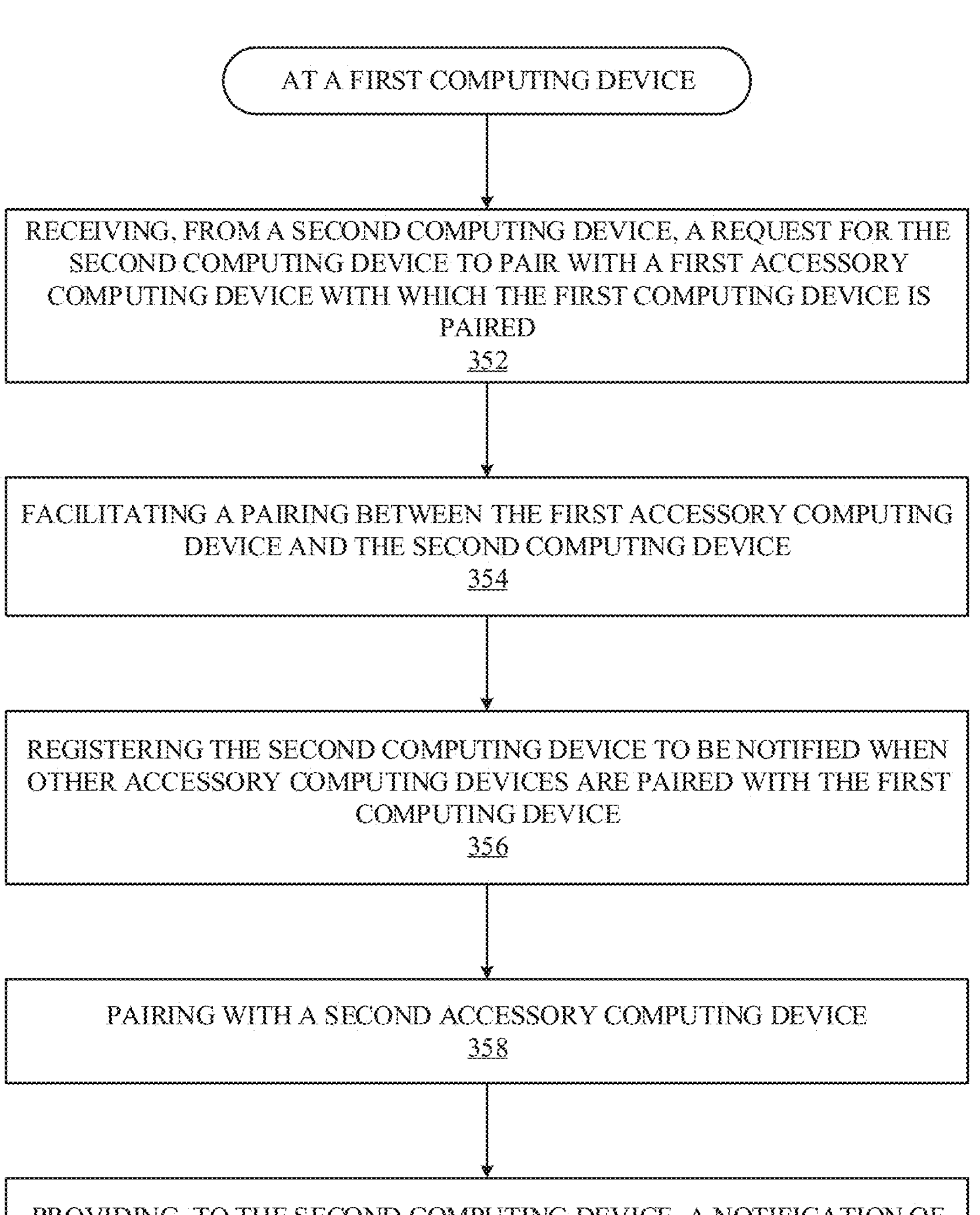
FIG. 3B illustrates a method for synchronizing pairing procedures between computing devices and accessory computing devices, according to some embodiments.

FIG. 3B illustrates a method 350 for synchronizing pairing procedures between computing devices and accessory computing devices, according to some embodiments. According to some embodiments, the method 350 can be implemented by a first computing device (e.g., a client device 116) that has already paired with an accessory computing device (e.g., a peripheral device 120). As shown in FIG. 3A, the method 350 begins at step 352, where the first computing device receives, from a second computing device, a request for the second computing device to pair with the first accessory computing device with which the first computing device is paired (e.g., as described above in conjunction with step 304 of FIG. 3A).

At step 354, the first computing device facilitates a pairing between the first accessory computing device and the second computing device (e.g., as described above in conjunction with steps 306-316 of FIG. 3A). At step 356, the first computing device registers the second computing device to be notified when other accessory computing devices are paired with the first computing device (e.g., as described above in conjunction with step 318 of FIG. 3A). Again, as described above, additional registrations can take place, such as bi-directional registrations, registrations for notifications about changes to pairings (rather than only additions, as in step 356), and so on. At step 358, the first computing device pairs with a second accessory computing device (e.g., as described above in conjunction with step 320 of FIG. 3A). At step 360, the first computing device provides, to the second computing device, a notification of the pairing between the first computing device and the second accessory computing device (e.g., as described above in conjunction with step 322 of FIG. 3A).

Figure 3C:
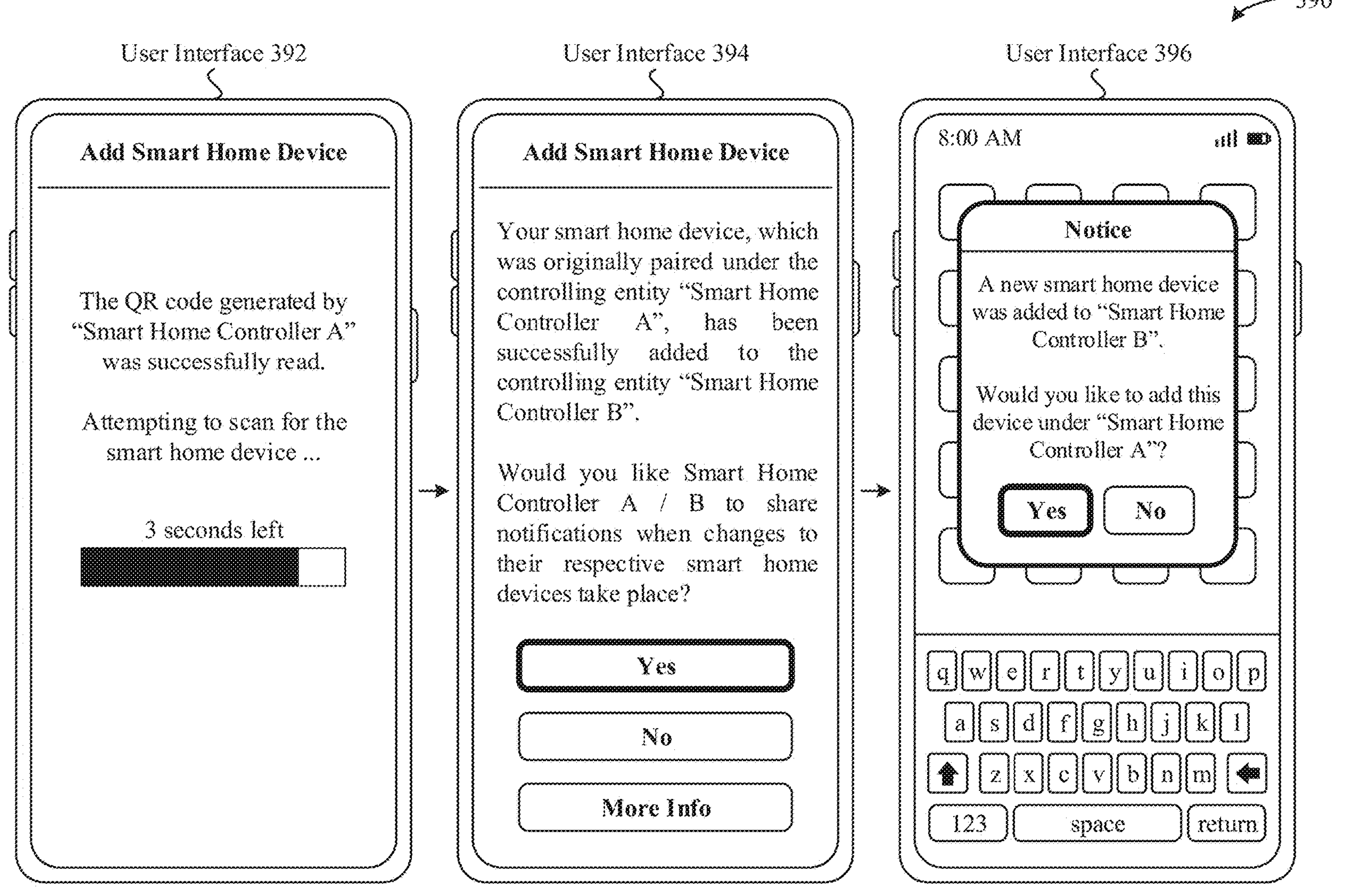
FIG. 3C illustrates a conceptual diagram of example user interfaces that can be implemented in conjunction with the techniques for synchronizing pairing procedures between computing devices and accessory computing devices described in conjunction with FIGS. 3A-3B.

FIG. 3C illustrates a conceptual diagram 390 of example user interfaces that can be implemented in conjunction with the techniques for synchronizing pairing procedures between computing devices and accessory computing devices described above in conjunction with FIGS. 3A-3B. As shown in FIG. 3C, an example user interface 392 can be displayed in conjunction with a user (e.g., operating a client device 116 under a smart home ecosystem 101-2 ("Smart Home Controller B")) scanning a QR code that is generated by a controlling entity (e.g., a smart home ecosystem 101-1 ("Smart Home Controller A")) that previously paired with a smart home device. Here, the client device 116, upon the smart home device successfully pairing with the smart home ecosystem 101-2, displays a user interface 394 that provides an option for the smart home ecosystems 101-1 and 101-2 to notify one another when changes are made to their respectively-managed smart home devices. In turn, when a new smart home device is added to the smart home ecosystem 101-2, the client device 116 can display a user interface 396 that provides notice of the addition, as well as an option that enables the new smart home device to be added to the smart home ecosystem 101-1. It is noted that the example user interfaces in FIG. 3C are merely exemplary, and can be modified in any fashion that implements, incorporates, reflects, etc., the various techniques described herein, at any level of granularity, without departing from the scope of this disclosure.

Figure 4A:
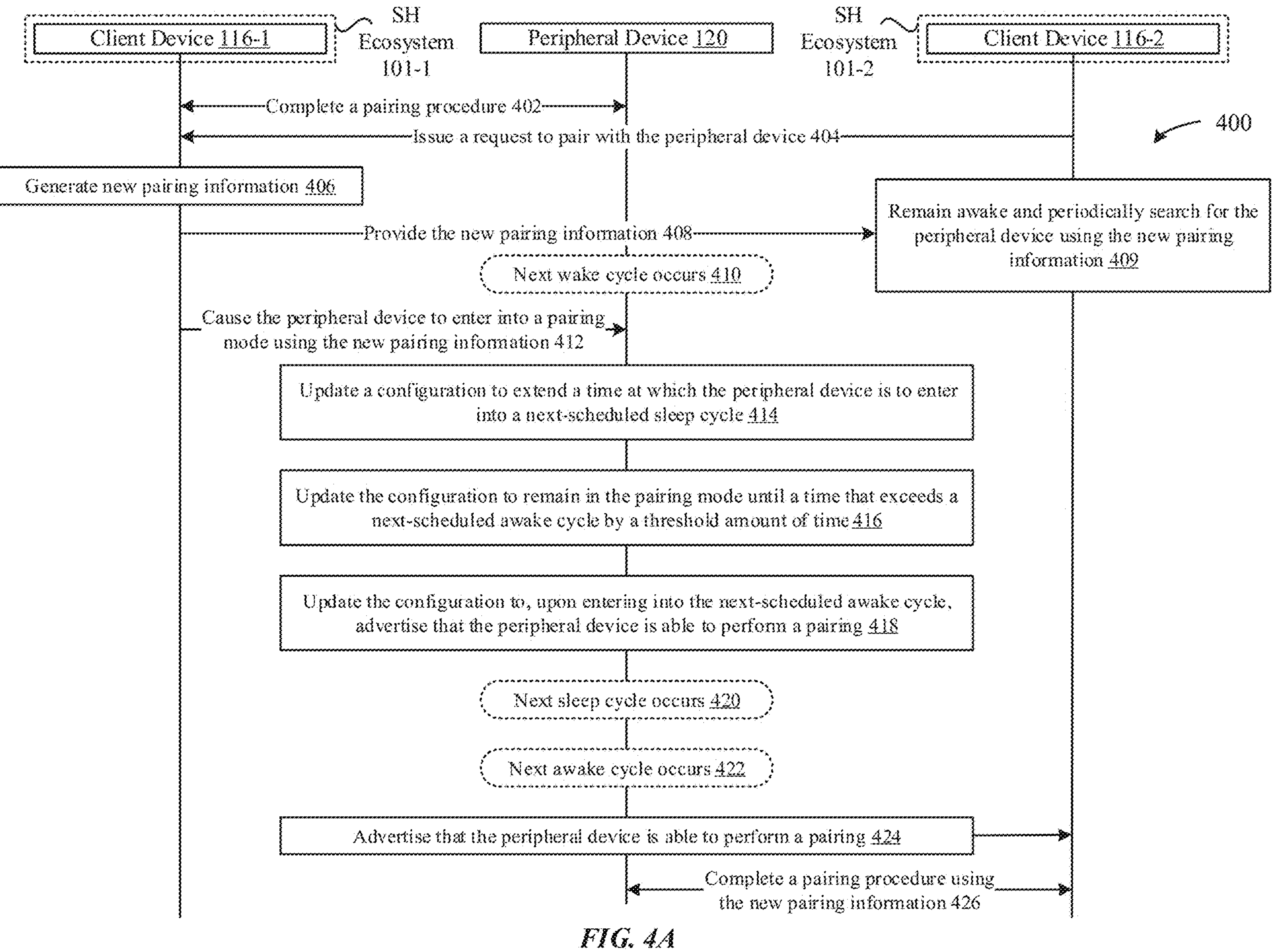
FIG. 4A illustrates a sequence diagram of a method for pairing accessory computing devices with other computing devices, according to some embodiments.

FIG. 4A illustrates a sequence diagram 400 of a method for pairing accessory computing devices with other computing devices, according to some embodiments. In particular, the method is directed to managing the wake/sleep cycles of peripheral devices 120 that have limited uptimes (e.g., battery powered devices, infrequently-accessed devices, etc.) in order to improve the overall likelihood that pairing procedures with the peripheral devices 120 will succeed. As shown in FIG. 4A, the sequence diagram 400 begins at step 402, where a smart home ecosystem 101-1, by way of a client device 116-1, completes a pairing procedure with a peripheral device 120 (e.g., as described above in conjunction with step 302 of FIG. 3A).

At step 404, a smart home ecosystem 101-2, by way of a client device 116-2, issues, to the client device 116-1/smart home ecosystem 101-1, a request to pair with the peripheral device 120 (e.g., as described above in conjunction with step 304 of FIG. 3A). It is noted that the client device 116-1 operating under the smart home ecosystem 101-1 and the client device 116-2 operating under the smart home ecosystem 101-2 can be one and the same, or distinct client devices 116, without departing from the scope of this disclosure. At step 406, the client device 116-1 (operating under the smart home ecosystem 101-1) generates new pairing information (e.g., as described above in conjunction with step 306 of FIG. 3A).

At step 408, the client device 116-1 (operating under the smart home ecosystem 101-1) provides the new pairing information to the client device 116-2 (operating under the smart home ecosystem 101-2) (e.g., as described above in conjunction with step 312 of FIG. 3A). In this manner, the client device 116-2 becomes equipped to pair with the peripheral device 120, and, at step 409, updates its configuration to remain awake and to periodically search (e.g., at any interval(s) of time) for the peripheral device 120 using the new pairing information. As illustrated in FIG. 4A, example sleep/awake cycle timing information is interleaved into the sequence diagram 400 to provide a better understanding of how the sleep/awake cycles can be modified to improve the overall likelihood that the request by the client device 116-2 to pair with the peripheral device 120 will succeed. In particular, the peripheral device 120 can enter into a wake cycle at step 410, thereby rendering the peripheral device 120 capable of receiving communications from the client device 116-1 and/or the client device 116-2. Accordingly, at step 412, the client device 116-2 causes the peripheral device 120 to enter into a pairing mode using the new pairing information (e.g., as described above in conjunction with step 308 of FIG. 3A).

At step 414, the peripheral device 120, in response to receiving the new pairing information at step 412, updates its configuration to extend a time at which the peripheral device 120 is to enter into a next-scheduled sleep cycle. The aforementioned time can be extended by any amount of time, e.g., five (5) seconds, a percentage of the wake cycle time (e.g., twenty-five (25) percent), and so on. In this manner, the current awake cycle time of the peripheral device 120 is effectively extended, which increases the likelihood that the client device 116-2 and the peripheral device 120 will successfully enter into communications with one another, engage in the pairing process, and complete the pairing process. In contrast, if the current awake cycle time of the peripheral device 120 were left unmodified, there is an increased likelihood that the peripheral device 120 will enter into a next sleep cycle prior to being contacted by the client device 116-2. Consequently, the client device 116-2 would likely experience a timeout when attempting to interface with the client device 116-2 (that has entered into a sleep cycle), which would prevent the pairing procedure from succeeding.

Additionally, and in the interest of achieving the same benefits potentially afforded through the implementation of step 414, at step 416, the peripheral device 120 updates its configuration to remain in the pairing mode until a time that exceeds a next-scheduled awake cycle by a threshold amount of time. For example, if step 414 is executed at 8:00 PM, the next-scheduled awake time is 8:15 PM, and the threshold amount of time is fifteen (15) minutes, then, based on the aforementioned rule, the peripheral device 120 will update its configuration to remain in the pairing mode until 8:25 PM. Consequently, the peripheral device 120 remains in the pairing mode not only through its current awake cycle (when step 416 is implemented), but also through its next awake cycle for the aforementioned threshold amount of time. This approach provides the benefit of enabling the client device 116-2 another opportunity to interface with the peripheral device 120 in the event that the peripheral device 120 entered into its next sleep cycle prior to the client device 116-2 effectively interfacing with the peripheral device 120 to perform the pairing procedure. In other words, a level of redundancy is established in that the client device 116-2 can reattempt to interface with the peripheral device 120 despite the initial missed opportunity to do so. This approach can be beneficial in that the pairing procedure likely will not need to be restarted via the device 116-1/smart home ecosystem 101-1/peripheral device 120 in order for the client device 116-2 to successfully interface with the peripheral device 120.

Additionally, and in the interest of achieving the same benefits potentially afforded through the implementation of steps 414/416, at step 418, the peripheral device 120 updates its configuration to, upon entering the next-scheduled awake cycle, advertise that the peripheral device 120 is able to perform a pairing. Any approach can be utilized that effectively enables the peripheral device 120 to broadcast to other computing devices-such as the client device 116-2—that the peripheral device 120 is capable of/prepared to perform a pairing procedure. For example, the peripheral device 120 can update its domain name service-service discovery (DNS-SD) record to convey that the peripheral device 120 is back online (and, presumably, prepared to conduct the pairing procedure that is being sought by the client device 116-2). This notion is captured by step 424—which takes place after the peripheral device 120 completes its next sleep cycle at step 420 and then enters into a next awake cycle at step 422—where the peripheral device 120 advertises that it is able to perform a pairing. Then, at step 426, the peripheral device 120 completes a pairing procedure with the client device 116 (operating under the smart home ecosystem 101-2) using the new pairing information (e.g., as described above in conjunction with step 316 of FIG. 3A).

Additionally, and although not illustrated in FIG. 4A, the client device 116-1 (operating under the smart home ecosystem 101-1) can be configured to, subsequent to causing the peripheral device 120 to enter into the pairing mode using the new pairing information (at step 412), periodically interface with the peripheral device 120 to determine whether the peripheral device 120 successfully paired with the client device 116-2 (operating under the smart home ecosystem 101-2). For example, the client device 116-1 can be configured to schedule a follow-up time that exceeds the time described above in conjunction with step 416 by a threshold amount of time (e.g., two (2) minutes). In this manner, the client device 116-1 can effectively determine whether the pairing procedure succeeded—and, in the event that it was unsuccessful, restart the pairing procedure (e.g., by re-executing steps 406-412).

Figure 4B:
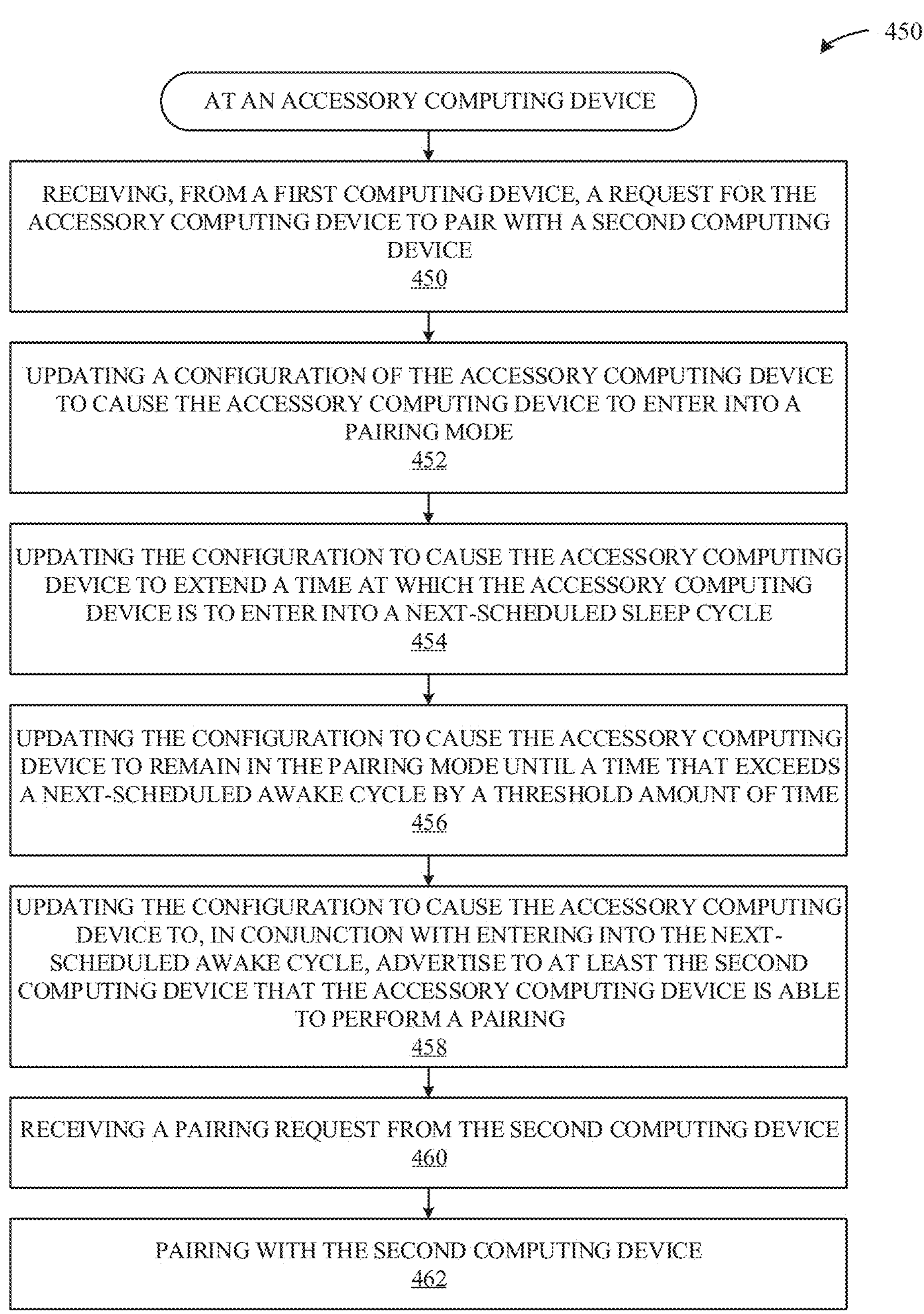
FIG. 4B illustrates a method for pairing accessory computing devices with other computing devices, according to some embodiments.

FIG. 4B illustrates a method 450 for pairing accessory computing devices with other computing devices, according to some embodiments. As shown in FIG. 4B, the method 450 begins at step 452, where an accessory computing device receives, from a first computing device, a request for the accessory computing device to pair with a second computing device (e.g., as described above in conjunction with step 412 of FIG. 4A). At step 454, the accessory computing device updates its configuration to enter into a pairing mode (e.g., as also described above in conjunction with step 412 of FIG. 4A).

At step 456, the accessory computing device updates its configuration to extend a time at which the accessory computing device is to enter into a next-scheduled sleep cycle (e.g., as described above in conjunction with step 414 of FIG. 4A). At step 458, the accessory computing device updates its configuration to remain in the pairing mode until a time that exceeds a next-scheduled awake cycle by a threshold amount of time (e.g., as described above in conjunction with step 416 of FIG. 4A). At step 460, the accessory computing device updates its configuration to, in conjunction with entering into the next-scheduled awake cycle, advertise to at least the second computing device that the accessory computing device is able to perform a pairing (e.g., as described above in conjunction with step 418 of FIG. 4A).

At step 462, the accessory computing device receives a pairing request from the second computing device (e.g., as described above in conjunction with step 426 of FIG. 4A). At step 464, the accessory computing device pairs with the second computing device (e.g., as also described above in conjunction with step 426 of FIG. 4A).

Figure 5:
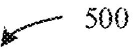
FIG. 5 illustrates a detailed view of a computing device that can be used to implement the various components described herein, according to some embodiments.
Figure 5:
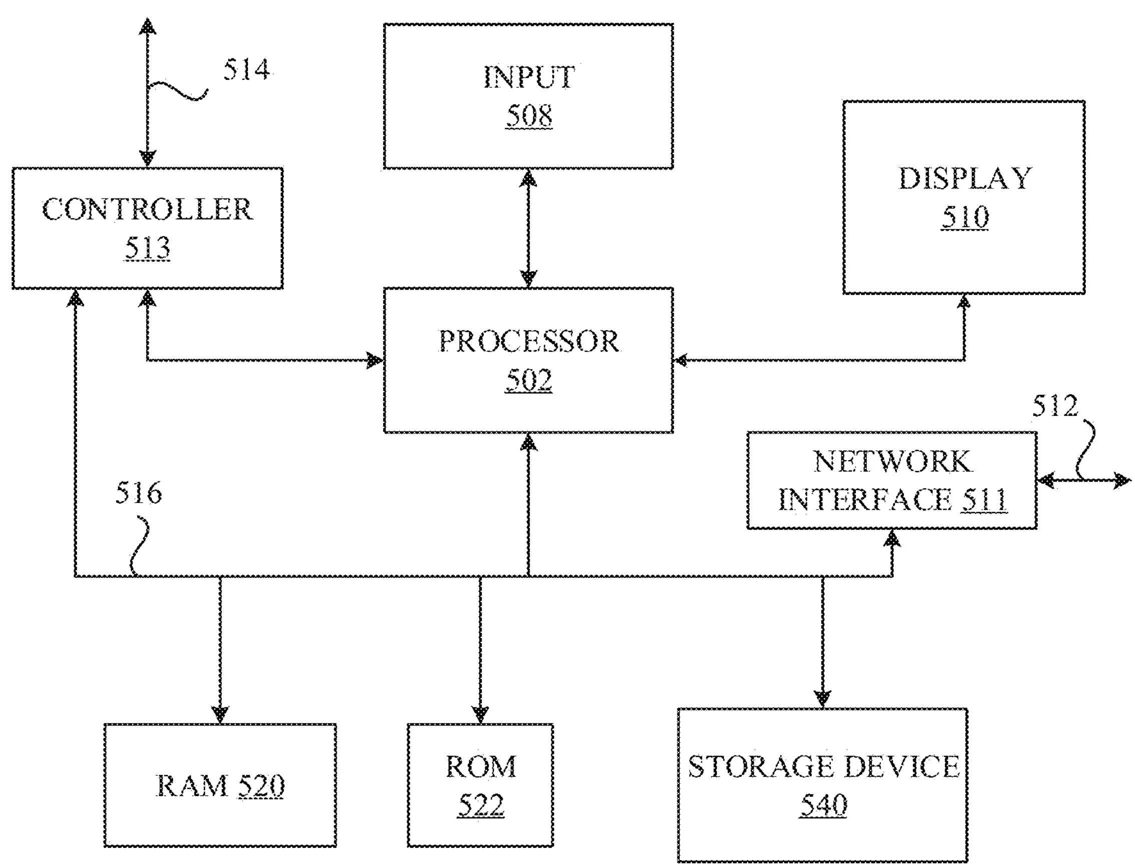

FIG. 5 illustrates a detailed view of a computing device 500 that can be used to implement the various components described herein, according to some embodiments. In particular, the detailed view illustrates various components that can be included in the server computing devices 102, the centralized management hubs 110, the peripheral device hubs 112, the client devices 116, and the peripheral devices 120 described above in conjunction with FIG. 1A.

As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Furthermore, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can comprise a single disk or a plurality of disks (e.g., SSDs), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of the computing devices described herein.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for guiding pairing procedures between computing devices and accessory computing devices, the method comprising, by a computing device that is seeking to pair with an accessory computing device:

obtaining at least an identifier and a setup code associated with the accessory computing device;

determining, by scanning a first communications network that is associated with the accessory computing device, that the identifier is not being advertised on the first communications network;

generating a hash value based on the identifier and the setup code;

identifying, by scanning a second communications network, that the hash value is being advertised on the second communications network; and displaying an affordance that instructs a user to perform (1) a factory reset of the accessory computing device, or (2) a secondary pairing procedure with the accessory computing device through at least one primary computing device with which the accessory computing device is currently paired.

2. The method of claim 1, wherein the identifier and the setup code are obtained by scanning a quick-response (QR) code that (1) is printed on the accessory computing device or materials associated with the accessory computing device, and/or (2) that is output on a display device with which the accessory computing device is communicatively coupled.

3. The method of claim 1, wherein the first and second communications networks utilize the same or different types of communications protocols.

4. The method of claim 1, wherein the first communications network comprises a Bluetooth network and the second communications network comprises a Wi-Fi network.

5. The method of claim 1, wherein, subsequent to completing an initial pairing procedure with the at least one primary computing device, the accessory computing device:

ceases advertising the identifier on the first communications network, and begins advertising the hash value on the second communications network.

6. The method of claim 1, wherein the accessory computing device advertises the hash value on the second communications network using Domain Naim Service (DNS)-based Service Discovery (DNS-SD) protocols that are implemented by the accessory computing device and the computing device.

7. The method of claim 1, wherein the affordance includes:

(1) first instructions for performing the factory reset of the accessory computing device, and (2) second instructions for performing the secondary pairing procedure with the at least one primary computing device, wherein the second instructions include at least some identifying information that is associated with the at least one primary computing device.

8. A method for synchronizing pairing procedures between computing devices and accessory computing devices, the method comprising, by a first computing device:

receiving, from a second computing device, a request for the second computing device to pair with a first accessory computing device with which the first computing device is paired;

facilitating a pairing between the first accessory computing device and the second computing device;

registering the second computing device to be notified when other accessory computing devices are paired with the first computing device;

pairing with a second accessory computing device; and providing, to the second computing device, a notification of the pairing between the first computing device and the second accessory computing device.

9. The method of claim 8, wherein facilitating the pairing comprises:

causing the first accessory computing device to enter into a pairing mode; and providing information to the second computing device, wherein the information comprises:

characteristic information associated with the first accessory computing device that causes the second computing device to display an affordance that includes at least some of the characteristic information, and an identifier and a setup code that enable the second computing device to pair with the first accessory computing device.

10. The method of claim 9, wherein the characteristic information comprises:

a name associated with the first accessory computing device, a room associated with the first accessory computing device, a zone associated with the first accessory computing device, a sleep interval associated with the first accessory computing device, or some combination thereof.

11. The method of claim 8, further comprising, in conjunction with providing the notification:

facilitating a second pairing between the second accessory computing device and the second computing device.

12. The method of claim 8, further comprising, in conjunction with registering the second computing device to be notified when other accessory computing devices are paired with the first computing device:

causing the second computing device to register the first computing device to be notified when other accessory computing devices are paired with the second computing device.

13. The method of claim 12, further comprising:

receiving, from the second computing device, a second notification that the second computing device has paired with a third accessory computing device; and pairing with the third accessory computing device.

14. The method of claim 13, further comprising:

receiving, from the second computing device, third information associated with the third accessory computing device, wherein the third information enables the pairing with the third accessory computing device.

15. A method for pairing accessory computing devices with other computing devices, the method comprising, by an accessory computing device that is paired with a first computing device:

receiving, from the first computing device, a request for the accessory computing device to pair with a second computing device;

updating a configuration of the accessory computing device to:

cause the accessory computing device to enter into a pairing mode, cause the accessory computing device to remain in the pairing mode until a time that exceeds a next-scheduled awake cycle of the accessory computing device by a threshold amount of time, and cause the accessory computing device to, in conjunction with entering into the next-scheduled awake cycle, advertise to at least the second computing device that the accessory computing device is able to perform a pairing;

receiving a pairing request from the second computing device; and pairing with the second computing device.

16. The method of claim 15, wherein advertising to at least the second computing device that the accessory computing device is able to perform a pairing comprises:

updating a Domain Name Service (DNS)-based Service Discovery (DNS-SD) record to refresh multicast records associated with the accessory computing device.

17. The method of claim 15, wherein:

the request includes an identifier and a setup code; and the pairing request includes at least the identifier and the setup code.

18. The method of claim 17, wherein the identifier and the setup code are provided by the first computing device to the second computing device, and the second computing device, in response to receiving the identifier and the setup code, updates a second configuration of the second computing device to cause the second computing device to remain awake and to periodically search for the accessory computing device based on at least the identifier.

19. The method of claim 15, further comprising, prior to pairing with the second computing device:

receiving, from the first computing device, an inquiry as to whether the accessory computing device has successfully paired with the second computing device; and providing, to the first computing device, an indication that the accessory computing device has not successfully paired with the second computing device, wherein the indication causes the first computing device to reissue the request to the accessory computing device.

20. The method of claim 15, further comprising:

updating the configuration of the accessory computing device to extend, by a second threshold amount of time, a second time at which the accessory computing device is to enter into a next-scheduled sleep cycle.

* * * * *